United States Patent
Wu

(10) Patent No.: US 8,929,282 B2
(45) Date of Patent: Jan. 6, 2015

(54) METHOD AND APPARATUS FOR TTI BUNDLING TRANSMISSION IN A WIRELESS COMMUNICATIONS SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 808 days.

(21) Appl. No.: 12/606,157

(22) Filed: Oct. 26, 2009

(65) Prior Publication Data

US 2010/0111068 A1    May 6, 2010

Related U.S. Application Data

(60) Provisional application No. 61/111,734, filed on Nov. 6, 2008.

(51) Int. Cl.
*H04W 4/00* (2009.01)
*H04L 1/18* (2006.01)

(52) U.S. Cl.
CPC .............. *H04L 1/189* (2013.01); *H04L 1/1812* (2013.01); *H04L 1/1887* (2013.01)
USPC ............................ 370/328; 370/338; 714/748

(58) Field of Classification Search
USPC .................................. 370/329–345; 714/748
See application file for complete search history.

(56) References Cited

U.S. PATENT DOCUMENTS

| 7,382,747 | B2 | 6/2008 | Hu | |
|---|---|---|---|---|
| 2008/0285491 | A1* | 11/2008 | Parkvall et al. | 370/310 |
| 2009/0259911 | A1* | 10/2009 | Tseng | 714/748 |
| 2009/0290559 | A1* | 11/2009 | Pelletier et al. | 370/336 |
| 2009/0307554 | A1* | 12/2009 | Marinier et al. | 714/748 |
| 2010/0042884 | A1* | 2/2010 | Kuo et al. | 714/748 |
| 2010/0192035 | A1* | 7/2010 | Sagfors et al. | 714/748 |

FOREIGN PATENT DOCUMENTS

CN    101009537 A    8/2007

OTHER PUBLICATIONS

3GPP, 3GPP TS 36.321 V8.3.0 Evolved Universal Terrestrial Radio Access (E-UTRA) Medium Access Control (MAC) protocol specification, Sep. 2008.
Ericsson: "On Uplink Coverage for LTE", TSG-RAN WG1 #52, R1-080865, Feb. 11-15, 2008, XP050109344, Sorrento, Italy.
LG Electronics Inc.: "Handling of Received UL Grant in RA procedure", 3GPP TSG-RAN2 Meeting #63, R2-084388, Aug. 18-22, 2008, pp. 1-3, XP050319458, Jeju, South Korea.
Huawei: "max HARQ transmission number of TTI bundling", 3GPP TSG-RAN WG2 Meeting #63bis, R2-085183, Sep. 29-Oct. 3, 2008, XP050320096, Prague, Czech Republic.
Huawei: "max HARQ transmission number of TTI bundling", 3GPP TSG-RAN WG2 Meeting #63, R2-084039, Aug. 18-22, 2008, XP050319199, Jeju, Korea.

(Continued)

*Primary Examiner* — Brandon Renner
(74) *Attorney, Agent, or Firm* — Winston Hsu; Scott Margo

(57) ABSTRACT

A method for handling a transmission time interval, hereinafter called TTI, bundling operation for a mobile device of a wireless communication system is disclosed. The method includes performing transmission of a TTI bundle, and ignoring all feedbacks and uplink grants for retransmission when the feedbacks and uplink grants for retransmission are received after the transmission of the TTI bundle and before the TTI where a feedback of the TTI bundle is expected.

6 Claims, 17 Drawing Sheets

(56) References Cited

OTHER PUBLICATIONS

Ericsson: "Initial Random Access Procedure for E-UTRAN", 3GPP TSG-RAN WG2 #55, R2-062853, Oct. 9-13, 2006, p. 1/6-6/6, XP003020362, Seoul, Korea.
Office action mailed on Jun. 11, 2012 for the China Application No. 200910221382.X, filing date Nov. 6, 2009, p. 1-4.
3GPP, TS 25.302 V5.6.0 (Sep. 2003), "3rd Generation Partnership Project; Technical Specification Group Radio Access Network; Services provided by the physical layer (Release 5)", coverpage, p. 10 and p. 20.
Office action mailed May 22, 2013 for the Taiwan Application No. 098137404, filing date Nov. 4, 2009, p. 1-10.

* cited by examiner

METHOD AND APPARATUS FOR TTI BUNDLING TRANSMISSION IN A WIRELESS COMMUNICATIONS SYSTEM

CROSS REFERENCE TO RELATED APPLICATIONS

This application claims the benefit of U.S. Provisional Application No. 61/111,734, filed on Nov. 6, 2008 and entitled "METHOD AND APPARATUS FOR TTI BUNDLING TRANSMISSION IN A WIRELESS COMMUNICATIONS SYSTEM" the contents of which are incorporated herein.

BACKGROUND OF THE INVENTION

1. Field of the Invention

The present invention relates to a method utilized in a wireless communication and communication device thereof, and more particularly, to a method of handling TTI bundling operation improving transmission in a wireless communication system and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

The main services and functions of the MAC layer include mapping between logical channels and transport channels; multiplexing/demultiplexing of RLC PDUs belonging to one or different radio bearers into/from transport blocks (TB) delivered to/from the physical layer on transport channels; buffer status reporting; power headroom reporting; error correction through HARQ (Hybrid Automatic Repeat Request); priority handling between logical channels of one UE; priority handling between UEs by means of dynamic scheduling; TTI (Transmission Time Interval) bundling transmission and padding.

TTI bundling transmission is introduced to improve LTE uplink coverage without the issues of overhead associated with L2 segmentation and ACK (Acknowledgement)/NACK (Negative Acknowledgement) errors. The UEs in cell boundary can reduce transmission delay by means of TTI bundling transmission. The activation and deactivation of TTI bundling transmission is controlled by RRC signaling message, e.g. RRC Connection Reconfiguration message.

In the MAC layer, adaptive and non-adaptive retransmissions are used. The adaptive retransmissions is performed on resources with a MCS (Modulation and Coding Scheme) indicated on a PDCCH (Physical Downlink Control Channel). The non-adaptive retransmission is performed on the same resource and with the same MCS as was used for the last made transmission attempt.

If TTI bundling is configured by the RRC layer, a parameter TTI_BUNDLE_SIZE provides the number of TTIs of a TTI bundle. Within a TTI bundle, HARQ retransmissions are non-adaptive and shall be performed without waiting for feedbacks (e.g. NACK or ACK) related to previous transmissions according to the parameter TTI_BUNDLE_SIZE. A feedback for a TTI bundle is only received for a specific TTI corresponding to TTI_BUNDLE_SIZE. A retransmission of a TTI bundle is also a TTI bundle. For transmission of an uplink message containing a C-RNTI (Cell Radio Network Temporary Identifier) MAC control element or an uplink message including a CCCH (Common Control Channel) SDU (Service Data Unit) during a random access procedure, the TTI bundling does not apply.

Activation and deactivation of TTI bundling transmission are configured by RRC signaling message. However, TTI bundling transmission is done in MAC/PHY layers. Therefore, the activation or deactivation of the TTI bundle may not be synchronized between the UE and the eNB. When the UE and the eNB activate or deactivate the TTI bundling operation in the different time, transmission interference or degradation of the system performance can occur.

Take an issue 1 for example. Please refer to FIG. 1, which is a schematic diagram of a TTI bundling operation according to the prior art. The UE activates the TTI bundling operation with a HARQ process id (identity) 0 at TTI 1. The TTI_BUNDLE_SIZE is set to 4. In this situation, transport blacks of the TTI bundle are transmitted from TTI 1 to TTI 4. When activation or deactivation of the TTI bundling operation is not synchronized between the UE and the eNB, the UE receives the feedback of the TTI bundle in the wrong TTI as being shown in FIG. 1 where an HARQ NACK is received in TTI 5. On the standpoint of the UE, the UE does not know if the received feedback corresponds to the TTI bundle or not.

The prior art does not specify when the UE shall perform a retransmission for a TTI bundling transmission after the feedback of the TTI bundling transmission is received. According to the prior art, a retransmission of a non-TTI-bundling transmission is performed in a TTI(n+4) when a feedback of the non TTI bundling transmission is received in a TTI(n). If a non-adaptive retransmission of the TTI bundle in FIG. 2 is performed based on the foregoing specification clause and thereby performed in TTI 9, the system performance may be downgraded since the non-adaptive retransmission is unnecessary (if the HARQ NACK does not correspond to the TTI bundle) or causes interference to transmissions of other UEs. For example, if a UE1 performs the non-adaptive retransmission in TTI 9 that has been allocated to a UE2 by the eNB due to the lack of synchronization of the TTI bundling activation, the transmission interference occurs.

Take an issue 2 for example. Please refer to FIG. 2, which is a schematic diagram of a TTI bundling operation according to the prior art. The TTI bundling operation is activated at the UE with a HARQ process id 0, and corresponding transport blocks are transmitted in a TTI bundle of TTIs 1-4. Due to the lack of synchronization of the TTI bundling activation, a HARQ ACK for the TTI bundle is received in TTI 5. No HARQ ACK is received in TTI 8 where the UE shall receive a feedback of the TTI bundle. As a result, a retransmission of the TTI bundle occurs in TTIs 17, 18, 19, and 20, configured by RRC signaling according to the prior art. This retransmission is unnecessary and wastes UE power since the eNB has feedback with the HARQ ACK for the TTI bundle. In addition, the retransmission may make interference to other UEs if any of the TTIs 17-20 has been allocated to other UEs.

In addition to the feedback, PDCCH information may be received during the period of waiting the feedback of a TTI bundle. The prior art does not specify how the UE shall deal with this situation, and thereby can cause an unnecessary retransmission or transmission interference.

Take an issue 3 for example. Please refer to FIG. 3, which is a schematic diagram of a TTI bundling operation according to the prior art. The TTI bundling operation is activated at the UE with a HARQ process id 0, and corresponding transport blocks are transmitted in a TTI bundle of TTIs 1-4. PDCCH information carrying an uplink (UL) grant including a MCS for an adaptive retransmission is received in TTI 5. This means that the eNB indicates the UE to perform an uplink transmission with the MCS in the adaptive way. If the adaptive retransmission in TTI 9 (5+4) occurs, the system performance is downgraded due to the unnecessary retransmission or transmission interference to other UEs.

During TTI bundling transmission, the UE possibly receives a request for deactivating the TTI bundling operation, also causing an unnecessary retransmission or transmission interference.

Take an issue 4 for example. Please refer to FIG. 4, which is a schematic diagram of a TTI bundling operation according to the prior art. The TTI bundling operation is activated at the UE with a HARQ process id 0, and corresponding transport blocks are transmitted in a TTI bundle of TTIs 1-4. The UE does not receive a HARQ NACK in TTI 8, and thereby a retransmission is configured to be performed in a TTI bundle of TTIs 17-20. The TTI bundling is deactivated at the UE with a HARQ process id 0 in TTI 18. According to the prior art, retransmissions in TTI 19 and 20 are cancelled. However, the prior art does not clearly specify when the UE receives a HARQ feedback of the retransmission. If the HARQ feedback of the retransmission is a NACK, the 2nd retransmission shall be performed. Even according to the retransmission clause for the non TTI bundling operation, the prior art does not specify that the UE shall perform the retransmission in TTI 22 or TTI 24. The 2nd retransmission is possibly performed at a TTI unexpected by the eNB, and thus an unnecessary retransmission or transmission interference to other UEs occurs, thereby downgrading the system performance.

Take an issue 5 for example. In the prior art, the TTI bundling operation does not apply for transmission of the uplink message containing the C-RNTI MAC control element or the uplink message including the CCCH SDU during the random access procedure (contention-based random access). On the other hand, the TTI bundling operation is applied for an MAC PDU transmission granted by a random access response which is triggered by a PDCCH order with a dedicated preamble (non-contention-based random access). Since the MAC PDU granted by the random access response contains no uplink data, using the TTI bundle to transmit the MAC PDU makes unnecessary retransmissions and wastes UE power.

SUMMARY OF THE INVENTION

Therefore, the present invention provides a method of handling a TTI bundling operation in a wireless communication system and related communication device to avoid transmission interference, unnecessary retransmissions, and a power waste.

According to an embodiment of the present invention, a method for handling a TTI bundling operation for a mobile device of a wireless communication system includes performing transmission of a TTI bundle, and ignoring all feedbacks and uplink grants for retransmission when the feedbacks and the uplink grants for retransmission are received after the transmission of the TTI bundle and before the TTI where the feedback of the TTI bundle is expected.

According to another embodiment of the present invention, a method for handling a TTI bundling operation for a mobile device of a wireless communication system includes transmitting a transport block in a first TTI bundle, and retransmitting the transport block when a non-positively-acknowledged feedback or an uplink grant for retransmission is received after the transport block transmission of the first TTI bundle and before a TTI where a feedback of the first TTI bundle is expected.

According to another embodiment of the present invention, a method for handling a TTI bundling operation for a mobile device of a wireless communication system includes initiating transmission of a TTI bundle, continuing the transmission of the TTI bundle when a TTI bundling deactivation request is received during the transmission of the TTI bundle, and deactivating the TTI bundling operation according to the TTI bundling deactivation request when the transmission of the TTI bundle is finished.

According to another embodiment of the present invention, a method for handling a TTI bundling operation for a mobile device of a wireless communication system includes initiating transmission of a TTI bundle, and when a TTI bundling deactivation request is received in a TTI of the TTI bundle, stopping the transmission of the TTI bundle in a TTI following the TTI of the TTI bundle.

According to another embodiment of the present invention, a method for handling a TTI bundling operation for a mobile device of a wireless communication system includes configuring transmission of a packet that corresponds to random access and that includes no data to be inapplicable for the TTI bundling operation.

According to another embodiment of the present invention, a communication device of a wireless communication system for appropriately handling a TTI bundling operation includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes performing transmission of a TTI bundle, and ignoring all feedbacks and uplink grants for retransmission when the feedbacks and the uplink grants for retransmission are received after the transmission of the TTI bundle and before the TTI where the feedback of the TTI bundle is expected.

According to another embodiment of the present invention, a communication device of a wireless communication system for appropriately handling a TTI bundling operation includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes transmitting a transport block in a first TTI bundle, and retransmitting the transport block when a non-positively-acknowledged feedback or an uplink grant for retransmission is received after the transport block transmission of the first TTI bundle and before a TTI where a feedback of the first TTI bundle is expected.

According to another embodiment of the present invention, a communication device of a wireless communication system for appropriately handling a TTI bundling operation includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes initiating transmission of a TTI bundle, continuing the transmission of the TTI bundle when a TTI bundling deactivation request is received during the transmission of the TTI bundle, and deactivating the TTI bundling operation according to the TTI bundling deactivation request when the transmission of the TTI bundle is finished.

According to another embodiment of the present invention, a communication device of a wireless communication system for appropriately handling a TTI bundling operation includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes initiating transmission of a TTI bundle, and when a TTI bundling deactivation request is received in a TTI of the TTI bundle, stopping the transmission of the TTI bundle in a TTI following the TTI of the TTI bundle.

According to another embodiment of the present invention, a communication device of a wireless communication system for appropriately handling a TTI bundling operation includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes configuring transmission of a packet that corresponds to random access and that includes no data to be inapplicable for the TTI bundling operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
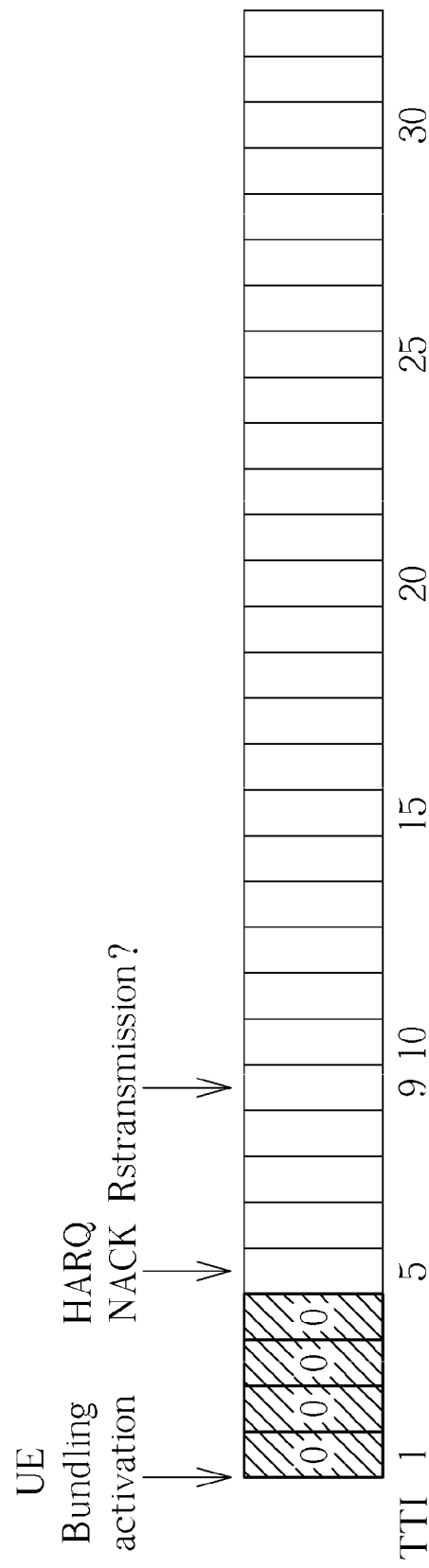
FIGS. 1-4 are schematic diagrams of TTI bundling operations according to the prior art.
Figure 5:
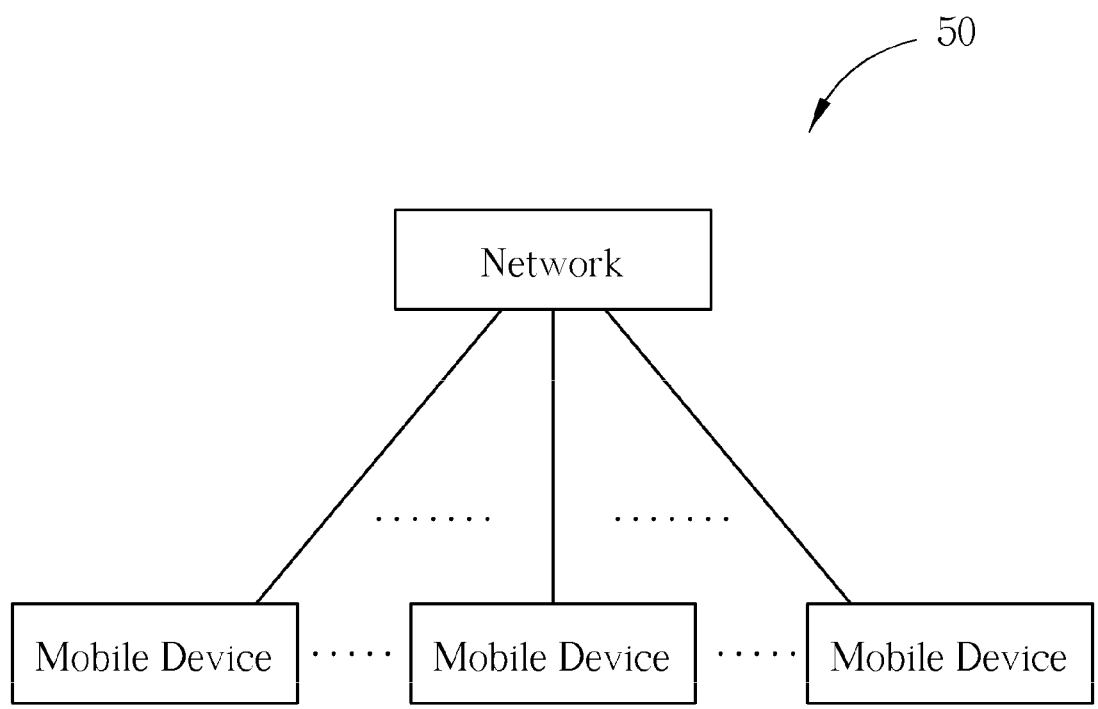
FIG. 5 is a schematic diagram of a wireless communication system.

Please refer to FIG. 5, which illustrates a schematic diagram of a wireless communication system 50 according to an embodiment of the present invention. Briefly, the wireless communication system 50 is composed of a network and a plurality of mobile devices. In FIG. 1, the network and the mobile devices are simply utilized for illustrating the structure of the wireless communication system 10. The wireless communication system 50 can be a UMTS (Universal Mobile Telecommunications System) or an LTE (long-term evolution) system. In the LTE system, the network is referred as a EUTRAN (evolved-UTRAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 6:
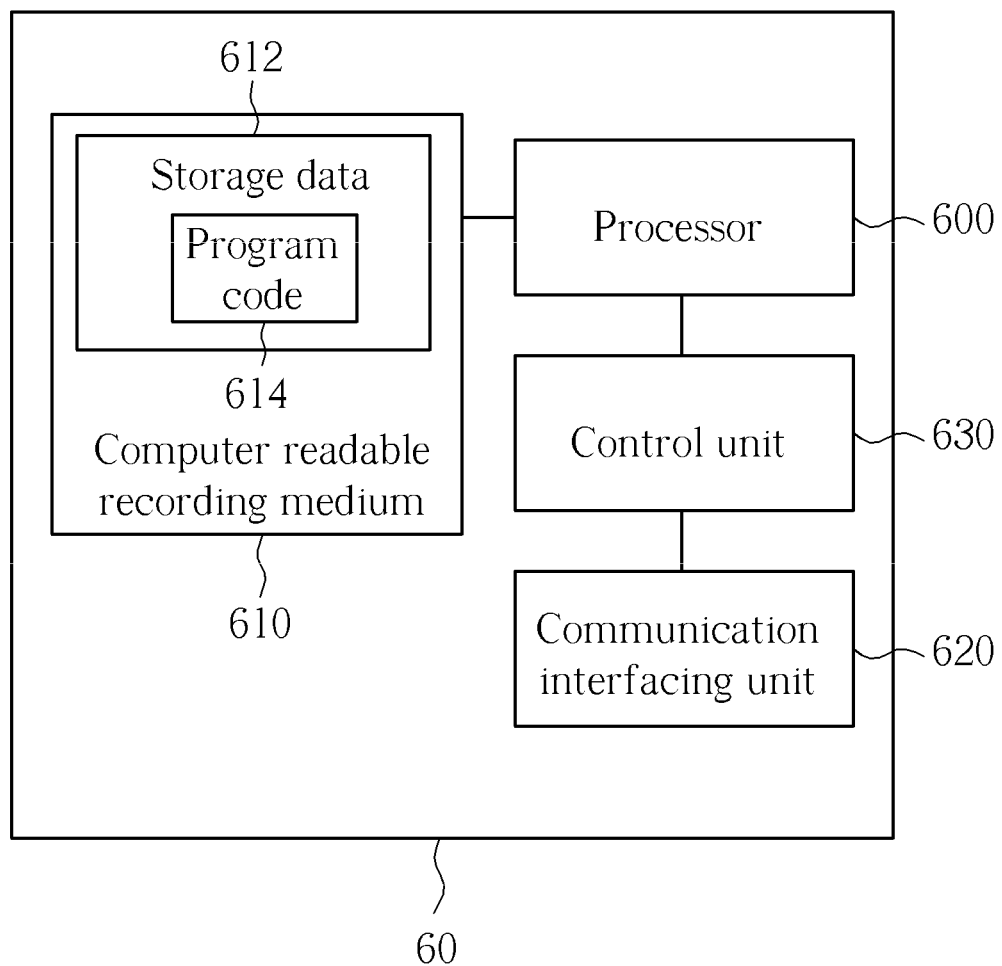
FIG. 6 is a schematic diagram of a communication device according to an embodiment of the present invention.

Please refer to FIG. 6, which illustrates a schematic diagram of a communication device 60 according to an embodiment of the present invention. The communication device 60 can be the mobile devices shown in FIG. 1 and includes a processor 600, a computer readable recording medium 610, a communication interfacing unit 620 and a control unit 630. The computer readable recording medium 610 is any data storage device that includes program code 614, thereafter read and processed by the processor 600. Examples of the computer readable recording medium 610 include a subscriber identity module (SIM), read-only memory (ROM), random-access memory (RAM), CD-ROMs, magnetic tapes, hard disks, optical data storage devices, and carrier waves (such as data transmission through the Internet). The control unit 630 controls the communication interfacing unit 620 and related operations and states of the communication device 60 according to processing results of the processor 600. The communication interfacing unit 620 is preferably a radio transceiver and accordingly exchanges wireless signals with the network.

Figure 7:
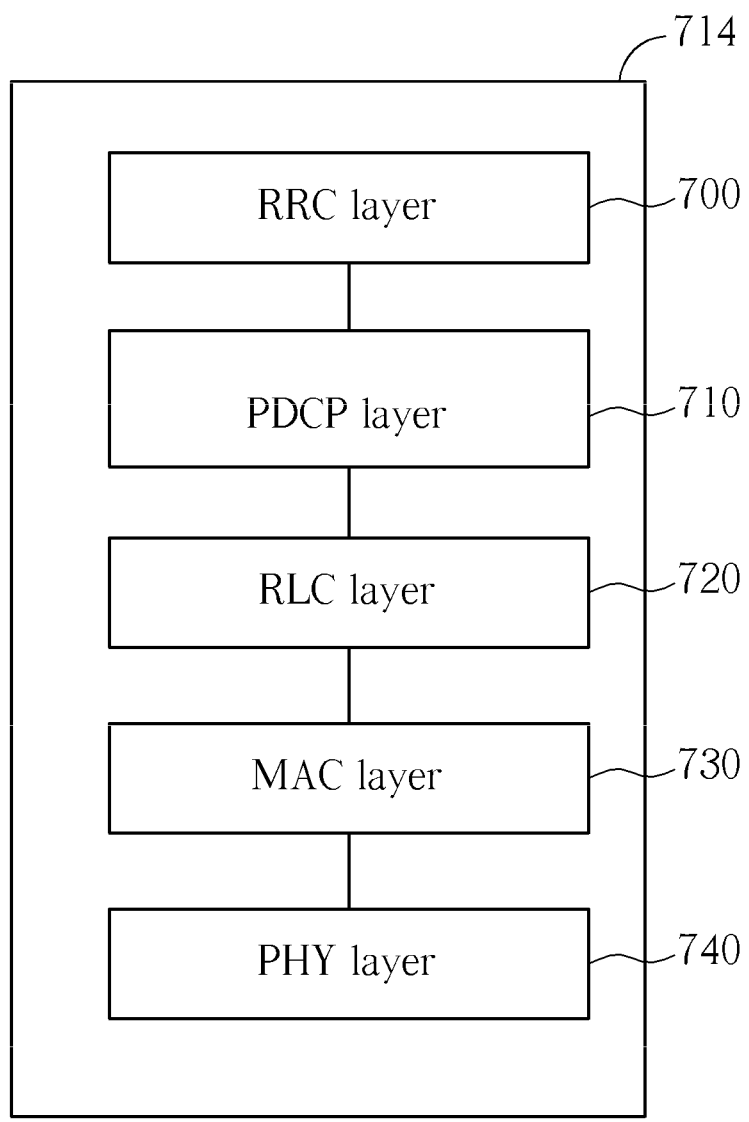
FIG. 7 is a schematic diagram of the program code for the LTE system according to an embodiment of the present invention.

Please refer to FIG. 7, which illustrates a schematic diagram of the program code 614 for the LTE system according to an embodiment of the present invention. The program code 614 includes program code of multiple communications protocol layers, which from top to bottom are a radio resource control (RRC) layer 700, a packet data convergence protocol (PDCP) layer 710, a radio link control (RLC) layer 720, a medium access control (MAC) layer 730 and a physical (PHY) layer 740. For packets of a layer, a service data unit (SDU) is a packet received from an upper layer, and a protocol data unit (PDU) is a packet that includes a header of the layer and zero or more SDUs and is transmitted to a lower layer.

The RRC layer 710 is used for configuring an activation state of a TTI (Transmission Time Interval) bundling operation and using a TTI_BUNDLE_SIZE parameter to set a size of a TTI bundle. The MAC layer 730 is responsible for handling the TTI bundling operation, such as handling activation and deactivation of the TTI bundling operation and handling applicable targets, by itself or based on RRC configuration. In addition, the MAC layer 730 can perform HARQ (Hybrid Automatic Repeat Request) processes for multiple transmissions of transport blocks and a random access procedure including transmission of a random access preamble, reception of a random access response, and transmission of a MAC PDU including no uplink data. The PHY layer 740 is capable of monitoring a physical downlink control channel for receiving an uplink grant, HARQ information, etc.

Figure 8:
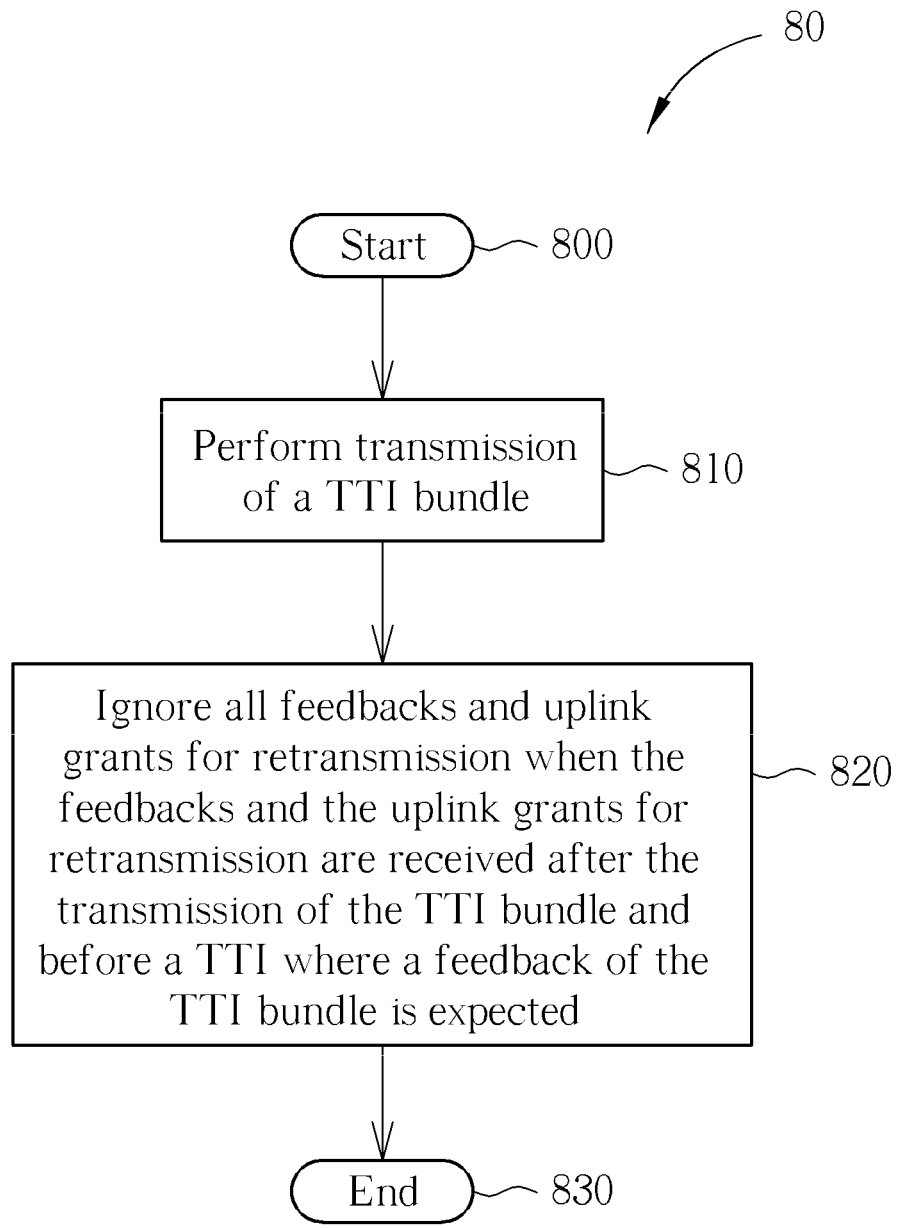
FIG. 8 is a flowchart of a process according to a first embodiment of the present invention.

Please refer to FIG. 8, which illustrates a flowchart of a process 80 according to a first embodiment of the present invention. The process 80 is utilized for handling a TTI bundling operation for a UE of a wireless communication system. The process 80 can be compiled into the program code 614 and includes the following steps:

Step 800: Start.

Step 810: Perform transmission of a TTI bundle.

Step 820: Ignore all feedbacks and uplink grants for retransmission when the feedbacks and the uplink grants for retransmission are received after the transmission of the TTI bundle and before a TTI where a feedback of the TTI bundle is expected.

Step 830: End.

According to the process 80, the UE activates TTI bundling operation and performs transmission of the TTI bundle by transmitting a plurality of transport blocks in the TTI bundle. The UE ignores all the feedbacks (e.g. ACK or NACK) and the uplink grants for retransmission received after the transmission of the TTI bundle and before the TTI where the feedback of the TTI bundle is expected. Alternatively, after the transmission of the TTI bundle and before the TTI where the feedback of the TTI bundle is expected, the UE stops reception of any feedbacks and uplink grants for retransmission. Preferably, the feedbacks are HARQ feedbacks.

When the activation or deactivation of the TTI bundling operation is not synchronized between the UE and the eNB, the UE receives a feedback of the TTI bundle in a feedback-unexpected TTI. By ignoring or stopping receiving the feedbacks and the uplink grants, the UE eliminates possibility of performing transmissions/retransmissions at the TTIs allocated to other UEs. Therefore, the transmission interference is avoided.

Figure 9:
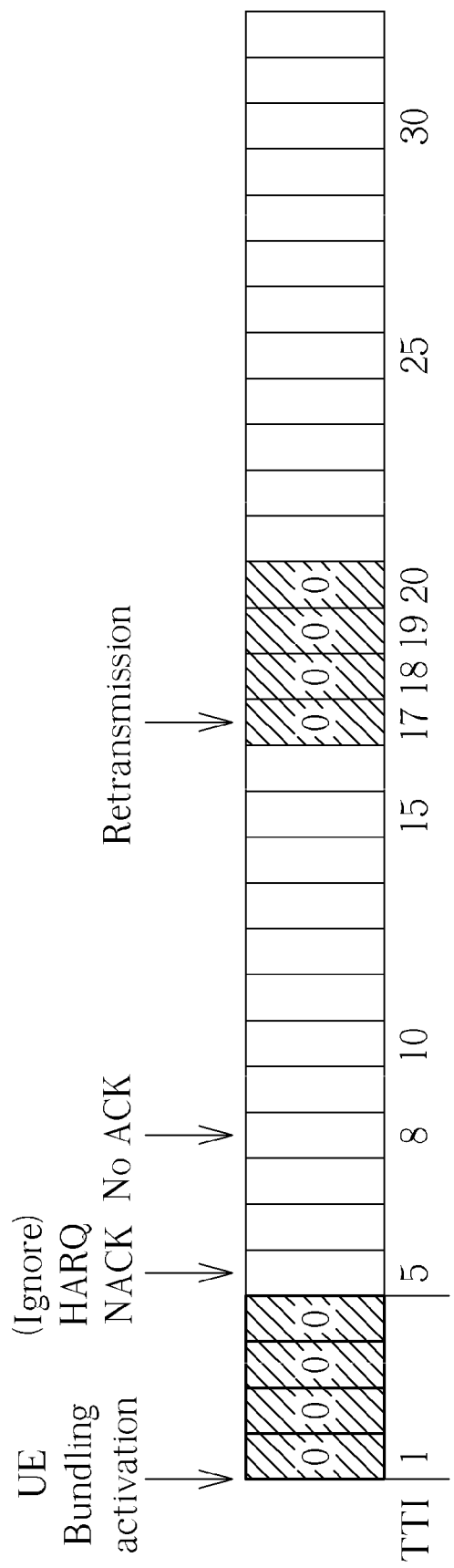
FIG. 9 is a schematic diagram of a TTI bundling operation according to FIG. 8.

Take an example based on the concept of the process 80. Please refer to FIG. 9, which is a schematic diagram of a TTI bundling operation according to an embodiment of the present invention. In FIG. 9, the TTI bundling operation is activated at a UE with a HARQ process id 0, and corresponding data is transmitted in a TTI bundle of TTIs 1-4 indicating that the TTI_BUNDLE_SIZE is set to 4. A TTI 8, derived from (a TTI 4+four TTIs), is the TTI where a HARQ feedback of the TTI bundle is expected (hereinafter also regarded as a TTI corresponding to the TTI_BUNDLE_SIZE). According to the process 80, the UE ignores HARQ feedbacks and uplink grants for retransmission during TTIs 5-7 and thereby ignores a HARQ NACK received in TTI 5. In other words, the UE only considers an HARQ feedback or an uplink grant received in TTI 8. In FIG. 9, the UE receives no ACK in TTI 8, and a corresponding retransmission of the TTI bundle is configured in TTIs 17, 18, 19, and 20. In this situation, a smart eNB is needed, capable of receiving and handling retransmissions of the UE in a non synchronous HARQ retransmission way in which the transmission and related retransmission do not have a fixed timing relationship.

Figure 10:
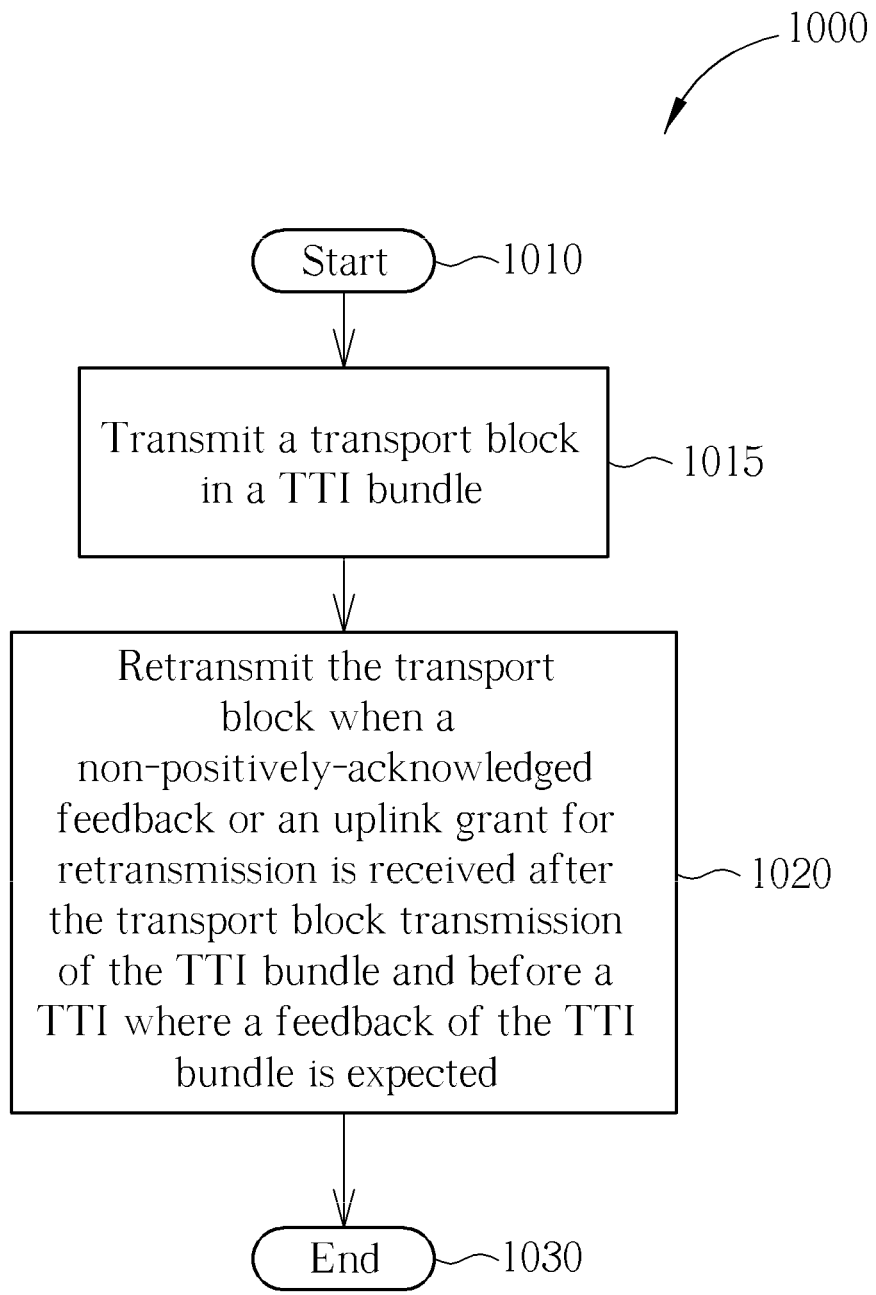
FIG. 10 is a flowchart of a process according to a second embodiment of the present invention.

Please refer to FIG. 10, which illustrates a flowchart of a process 1000 according to a second embodiment of the present invention. The process 1000 is utilized for handling a TTI bundling operation for a UE of a wireless communication system. The process 1000 can be compiled into the program code 614 and includes the following steps:

Step 1010: Start.

Step 1015: Transmit a transport block in a TTI bundle.

Step 1020: Retransmit the transport block when a non-positively-acknowledged feedback or an uplink grant for retransmission is received after the transport block transmission of the TTI bundle and before a TTI where a feedback of the TTI bundle is expected.

Step 1030: End.

According to the process 1000, the UE transmits the transport block in the TTI bundle and retransmits the transport block when receiving the non-positively-acknowledged feedback or the uplink grant for retransmission after the transport block transmission of the TTI bundle and before the TTI where the feedback of the TTI bundle is expected. The UE can retransmit the transport block in another TTI bundle used for retransmission when the TTI bundling operation is still configured at TTI(s) of the TTI bundle used for retransmission. On the contrary, the UE can retransmit the transport block in a non-TTI-bundling way when the TTI bundling operation has been de-configured at the TTI(s) used for retransmission. The non-TTI-bundling way can be an adaptive retransmission configured for only one TTI. Furthermore, the UE can cancel the retransmission of the transport block when the UE receives a positively-acknowledged feedback for any TTI of the TTI bundle or receives an uplink grant for any TTI of the TTI bundle.

In the second embodiment, a smart eNB with a non synchronous HARQ retransmission ability is needed.

Preferably, the non-positively-acknowledged feedback is a HARQ NACK or represents that neither HARQ ACK nor HARQ NACK is received; the positively-acknowledged feedback is a HARQ ACK; the uplink grant for retransmission or for any TTI of the TTI bundle is received from a PDCCH.

Figure 11:
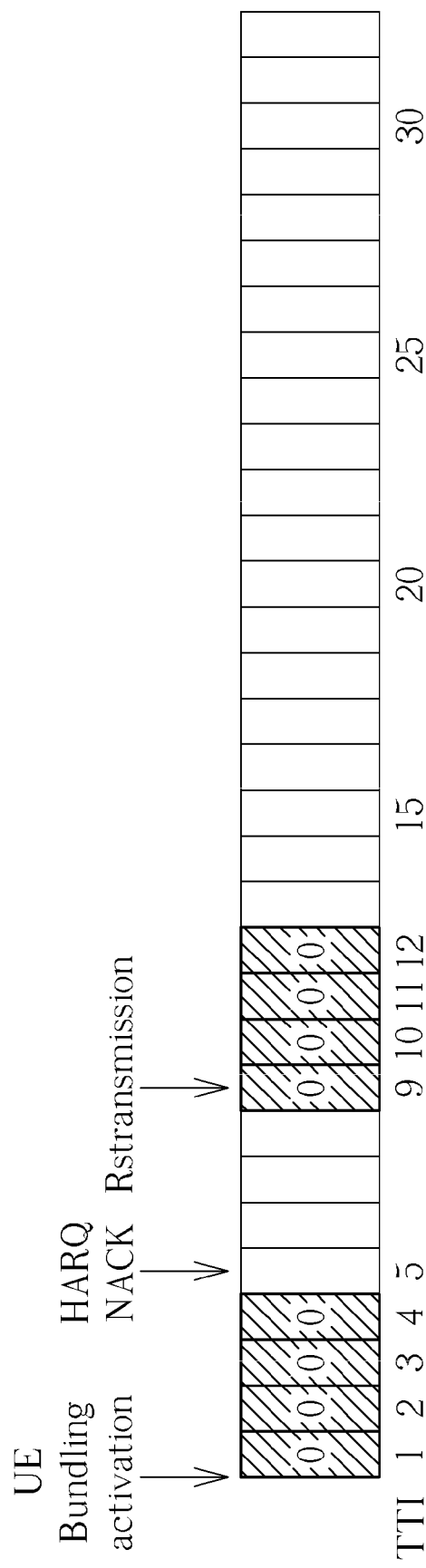
FIG. 11 is a schematic diagram of a TTI bundling operation according to FIG. 10.

Take an example based on the concept of the process 1000. Please refer to FIG. 11, which is a schematic diagram of a TTI bundling operation according to an embodiment of the present invention. The UE performs activation of the TTI bundling operation, transmission of a TTI bundle, and reception of a HARQ feedback in the same way as performed in FIG. 1. As can be seen from FIG. 11, a HARQ NACK is received in TTI 5 that is a TTI before the TTI corresponding to the TTI_BUNDLE_SIZE. The UE retransmits the transport block in TTI 9 in TTI bundling form (retransmits in TTIs 9-12) if the TTI bundling operation is still configured in TTI 9 as shown in FIG. 11. The UE retransmits in non-TTI-bundling form (only retransmits in TTI 9) if the TTI bundling operation has been de-configured in TTI 9, not shown in FIG. 11.

Figure 2:
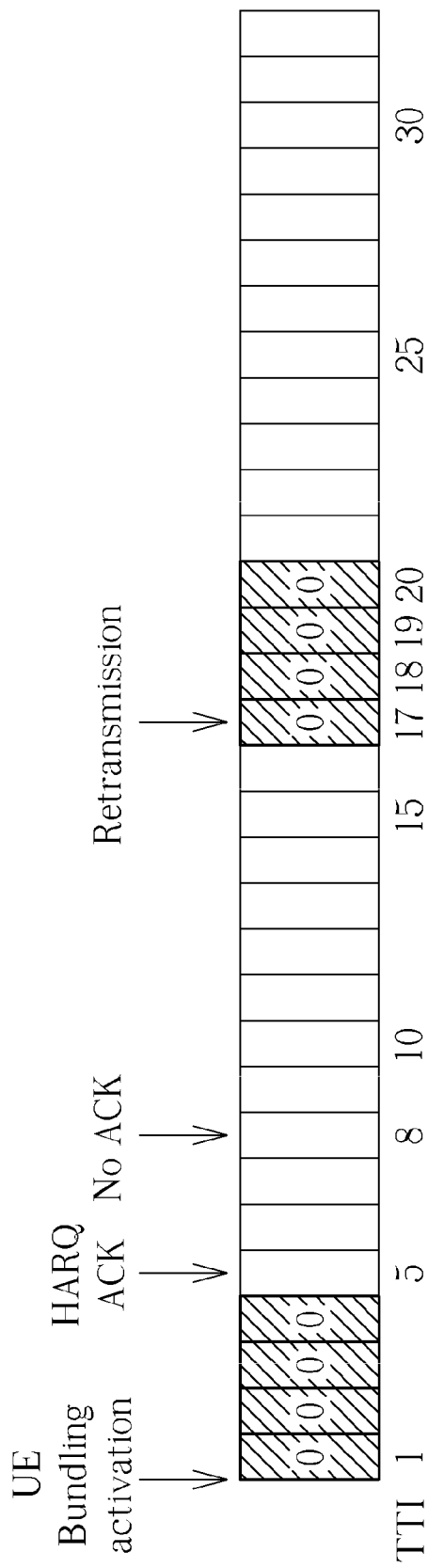
Figure 3:
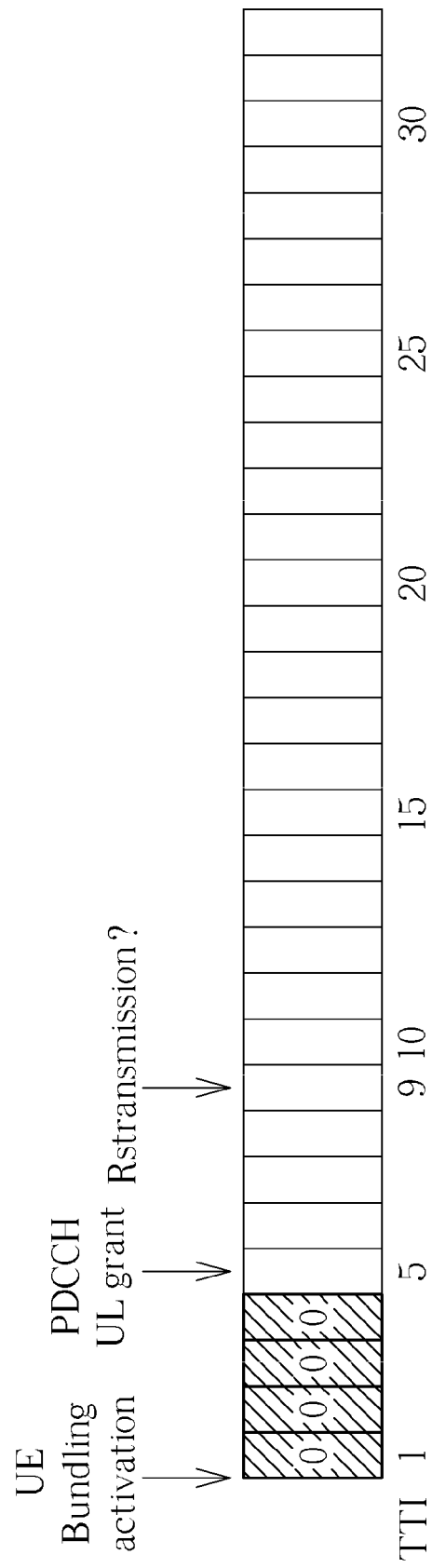
Figure 12:
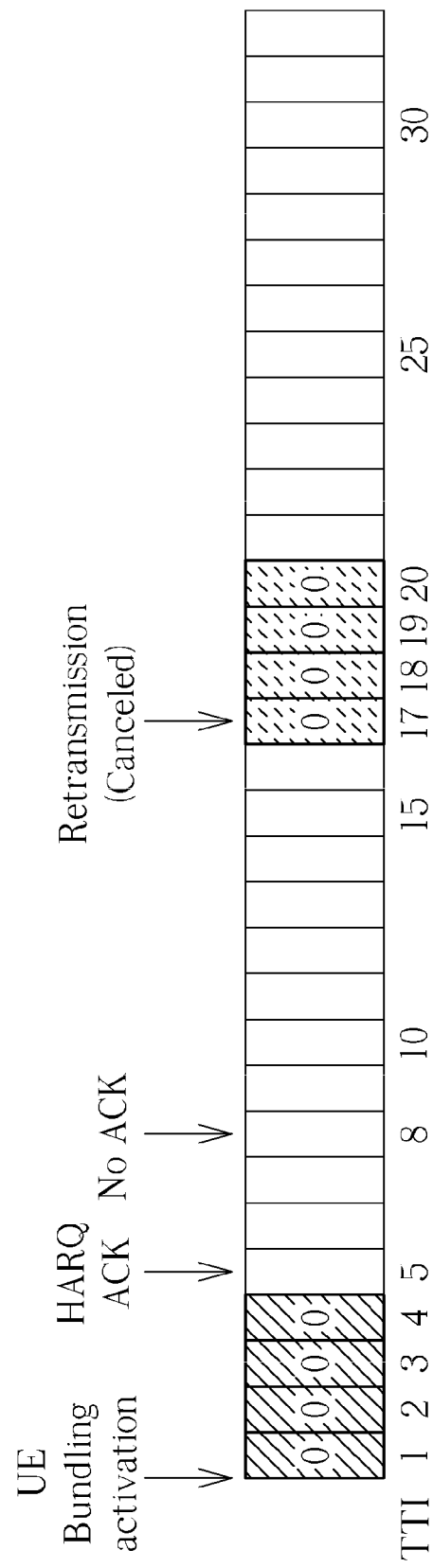
FIG. 12 is a schematic diagram of a TTI bundling operation according to FIG. 10.

Take another example based on the concept of the process 1000. Please refer to FIG. 12, which is a schematic diagram of a TTI bundling operation according to an embodiment of the present invention. The UE performs activation of the TTI bundling operation, transmission of a TTI bundle, and reception of a HARQ feedback in the same way as performed in FIG. 2. As can be seen from FIG. 12, a HARQ ACK is received in TTI 5 that is considered a TTI corresponding to TTI 1 of the TTI bundle. In this situation, the UE cancels the retransmission of the transport blocks, which attempts to be transmitted in TTIs 17-20.

Figure 13:
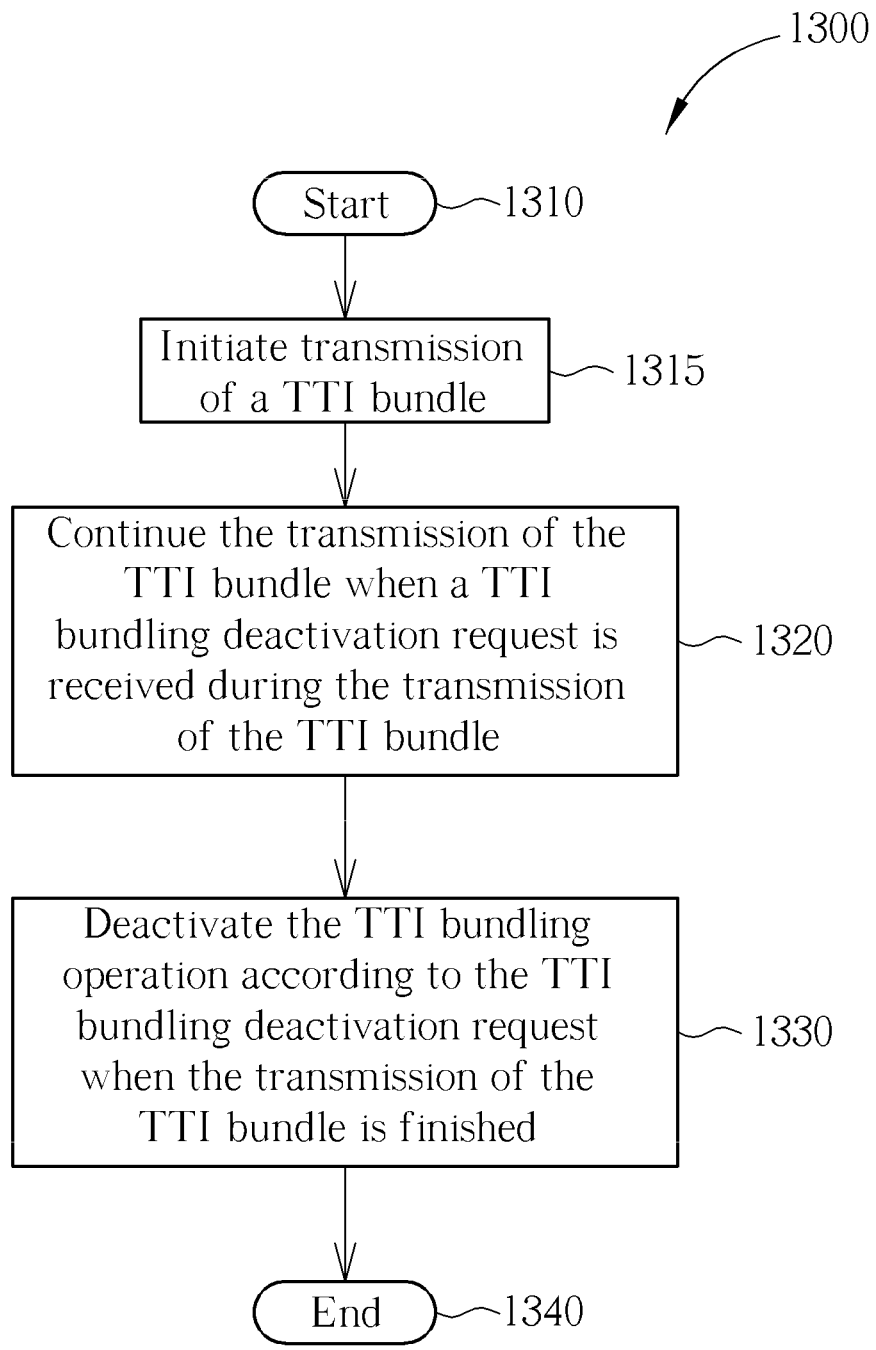
FIG. 13 is a flowchart of a process according to a third embodiment of the present invention.

Please refer to FIG. 13, which illustrates a flowchart of a process 1300 according to a third embodiment of the present invention. The process 1300 is utilized for deactivating a TTI bundling operation for a UE of a wireless communication system. The process 1300 can be compiled into the program code 614 and includes the following steps:

Step 1310: Start.

Step 1315: Initiate transmission of a TTI bundle.

Step 1320: Continue the transmission of the TTI bundle when a TTI bundling deactivation request is received during the transmission of the TTI bundle.

Step 1330: Deactivate the TTI bundling operation according to the TTI bundling deactivation request when the transmission of the TTI bundle is finished.

Step 1340: End.

According to the process 1300, the UE initiates the transmission of the TTI bundle and then continues transmitting the TTI bundle when receiving the TTI bundling deactivation request during the transmission of the TTI bundle. Furthermore, the UE deactivates the TTI bundling operation according to the TTI bundling deactivation request when the transmission of the TTI bundle is finished. In other words, when the TTI bundling deactivation request during the transmission of the TTI bundle is received, the UE does not deactivate the TTI bundle operation until finishing the transmission of the TTI bundle.

Through the process 1300, the UE maintains a purpose of the TTI bundling operation, which aims to provide a high successful decoding rate of the transmission data.

Figure 4:
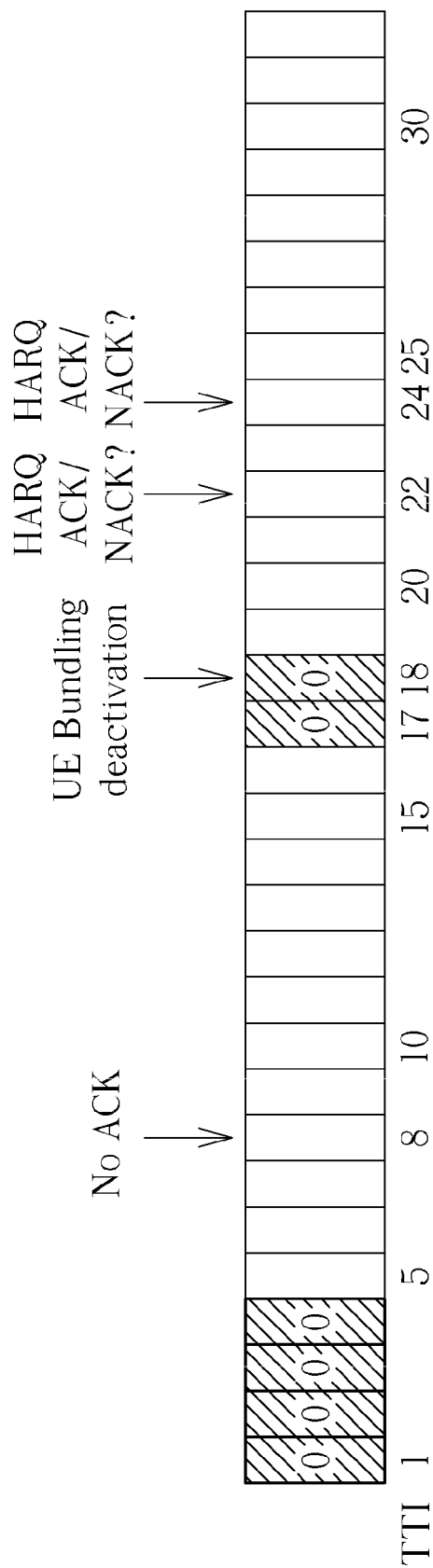
Figure 14:
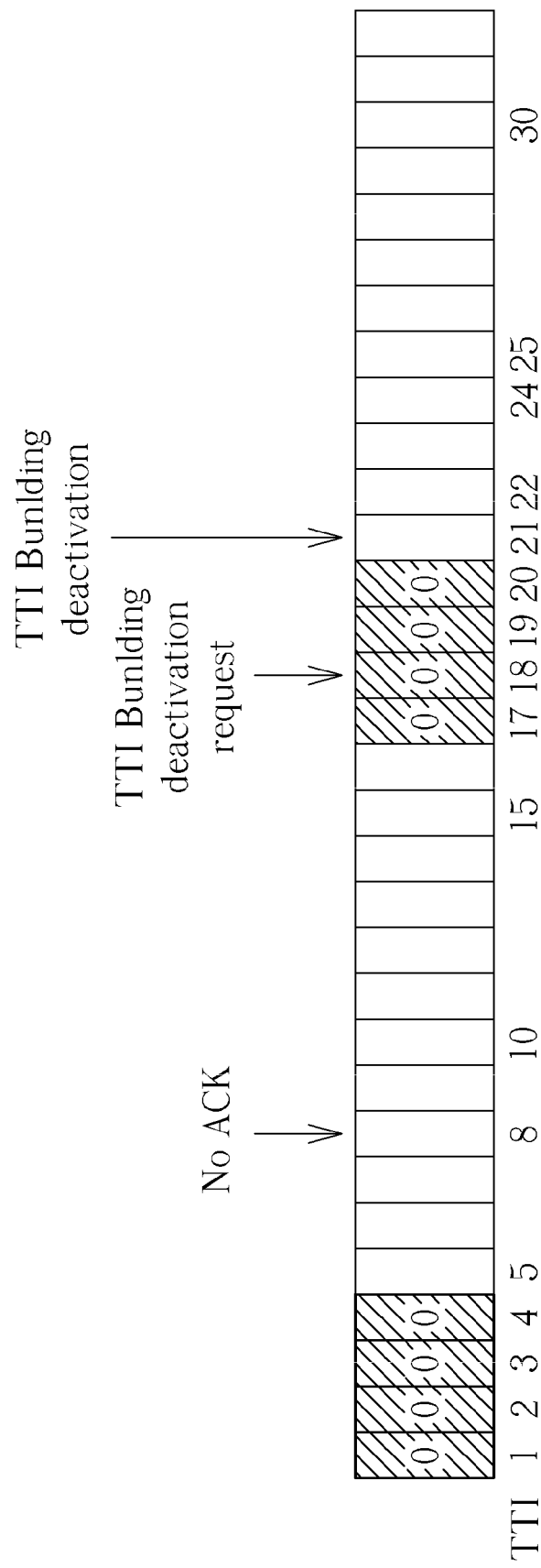
FIG. 14 is a schematic diagram of a TTI bundling operation according to FIG. 13.

Take another example based on the concept of the process 1300. Please refer to FIG. 14, which is a schematic diagram of a TTI bundling operation according to an embodiment of the present invention. The UE performs activation of the TTI bundling operation, transmission of a TTI bundle, and reception of a HARQ feedback and a TTI bundling deactivation request in the same way as performed in FIG. 4. According to the concept of the process 1300, the UE finishes retransmitting transport blocks of TTIs 18-20 of the TTI bundle and then deactivates the TTI bundle operation from TTI 21.

Figure 15:
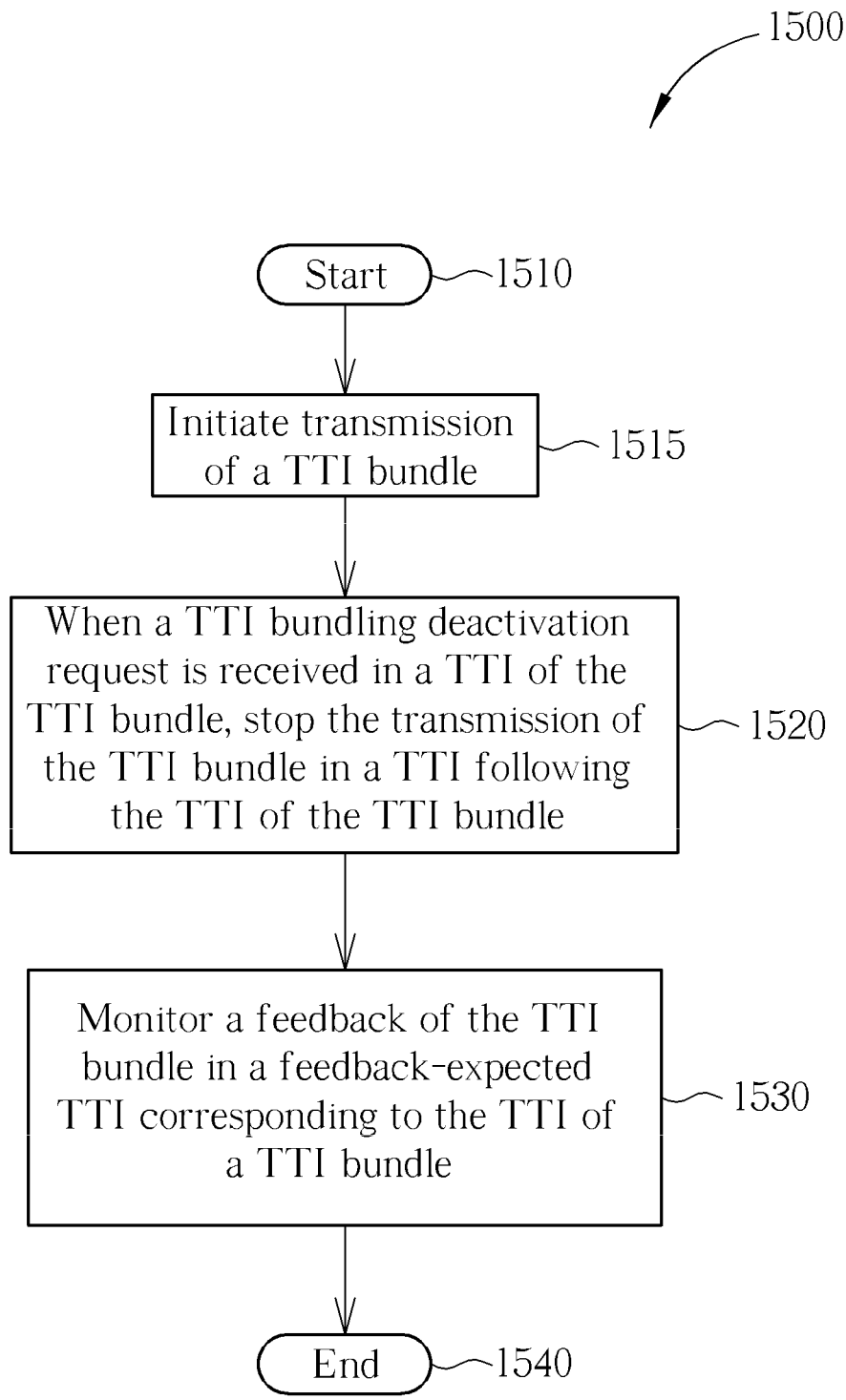
FIG. 15 is a flowchart of a process according to a fourth embodiment of the present invention.

Please refer to FIG. 15, which illustrates a flowchart of a process 1500 according to a fourth embodiment of the present invention. The process 1500 is utilized for deactivating a TTI bundling operation for a UE of a wireless communication system. The process 1500 can be compiled into the program code 614 and includes the following steps:

Step 1510: Start.

Step 1515: Initiate transmission of a TTI bundle.

Step 1520: When a TTI bundling deactivation request is received in a TTI of the TTI bundle, stop the transmission of the TTI bundle in a TTI following the TTI of the TTI bundle.

Step 1530: Monitor a feedback of the TTI bundle in a feedback-expected TTI corresponding to the TTI of a TTI bundle.

Step 1540: End.

According to the process 1500, the UE initiates the transmission of the TTI bundle. When receiving the TTI bundling deactivation request in a TTI of the TTI bundle (hereinafter denoted as TTI_1), the UE stops transmission of the TTI bundle in next TTI. As a result, TTI_1 is considered the last TTI performing transmission in the TTI bundle. After this, the UE monitors the feedback of the TTI bundle in a feedback-expected TTI corresponding to the TTI_1. In addition, if HARQ transmission is adopted, the UE can further monitor the feedback in a feedback-expected TTI corresponding to the last TTI of the TTI bundle when the UE does not transmit a transport block of a HARQ process different from a HARQ process of the TTI bundle.

Alternatively, the UE can replace the action of Step 1530 with monitoring the feedback of the TTI bundle in a feedback-expected TTI corresponding to the last TTI of the TTI bundle.

In the fourth embodiment, the eNB is setup with retransmission clause based on the process 1500, and thereby transmits the feedback in the feedback-expected TTI corresponding to the TTI of the TTI bundle or to the last TTI of the TTI bundle.

Take an example based on the concept of the process 1500. Please refer to FIG. 16, which is a schematic diagram of a TTI bundling operation according to an embodiment of the present invention. The UE performs activation of the TTI bundling operation, transmission of a TTI bundle, and reception of a HARQ feedback and a TTI bundling deactivation request in the same way as performed in FIG. 4. According to the concept of the process 1500, the UE finishes transmitting a transport block of TTI 18 of the TTI bundle and then stops TTI bundle operation from TTI 19. After this, the UE monitors a feedback (the HARQ ACK or NACK) of the TTI bundle in TTI 22 (18+4) corresponding to TTI 18 that is the TTI for the last transmission of the TTI bundle.

Figure 16:
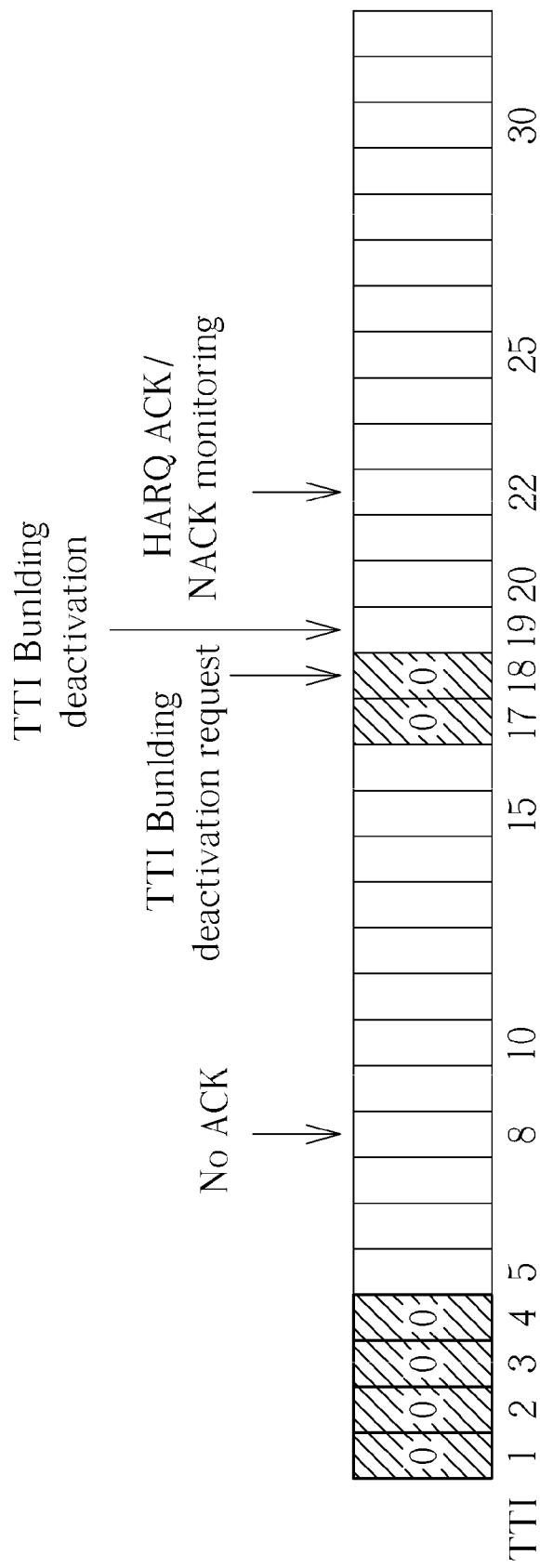
FIG. 16 is a schematic diagram of a TTI bundling operation according to FIG. 15.

In the TTI bundling operation of FIG. 16, the UE can alternatively monitor the feedback of the TTI bundle in TTI 24 (20+4) corresponding to TTI 20 that is the last TTI of the TTI bundle.

Figure 17:
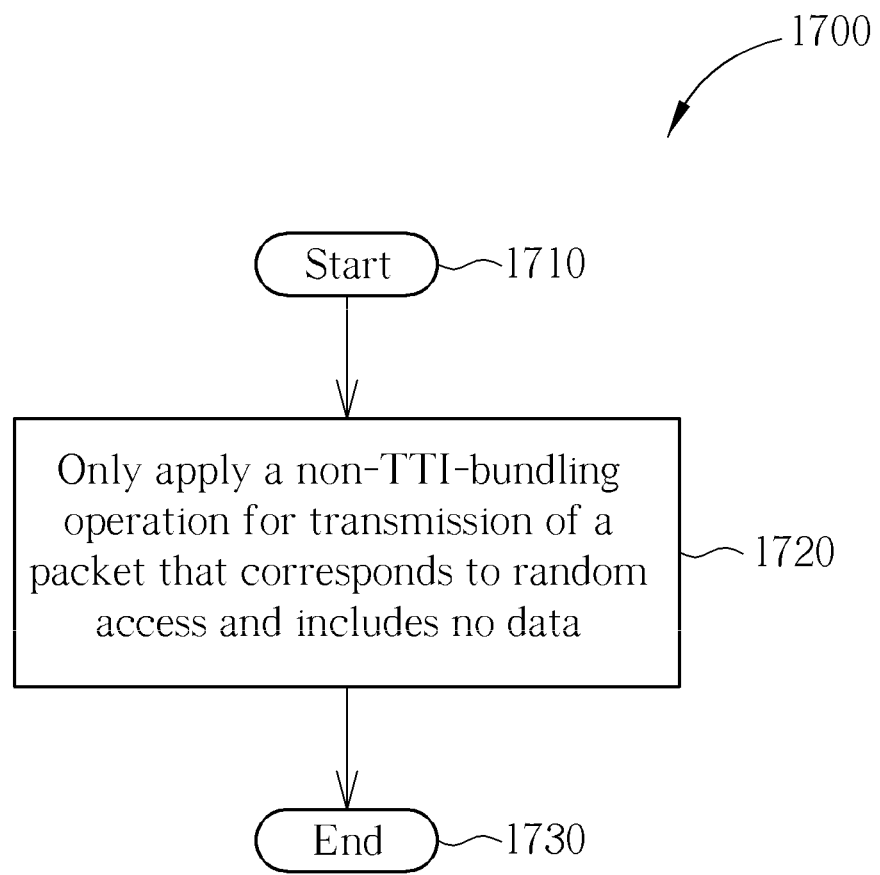
FIG. 17 is a flowchart of a process according to a fifth embodiment of the present invention.

Please refer to FIG. 17, which illustrates a flowchart of a process 1700 according to a fifth embodiment of the present invention. The process 1700 is utilized for applying a TTI bundling operation for a UE of a wireless communication system. The process 1700 can be compiled into the program code 614 and includes the following steps:

Step 1710: Start.

Step 1720: Only apply a non-TTI-bundling operation for transmission of a packet that corresponds to random access and includes no data.

Step 1730: End.

According to the process 1700, the UE only applies the non-TTI-bundling operation for the transmission of the packet that corresponds to random access and includes no data. The packet includes no data herein can mean that the packet only has header part. In other words, the transmission of the packet is configured to be inapplicable for the TTI bundling operation. The process 1700 eliminates pure uplink signaling/configuration TTI bundling transmission related to non-contention-based random access since the signaling/configuration information is not used for soft combination, thereby saving UE power.

Preferably, the packet is a MAC PDU containing no uplink data corresponding to an uplink grant received in a random access response triggered by a PDCCH order with a dedicated preamble. Or, the packet is a MAC PDU in a [Message3] buffer for a non-contension-based random access procedure.

In conclusion, the embodiments of the present invention can prevent the UE from performing retransmissions in TTIs undesired by the network and eliminates TTI bundling transmission of pure random access signaling/configuration, so as to avoid transmission interference, unnecessary retransmissions, and a UE power waste.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a transmission time interval, hereinafter called TTI, bundling operation for a mobile device of a wireless communication system, the method comprising:
   performing transmission of a TTI bundle; and
   when at least one of a first feedback and a first uplink grant for retransmission is received after the transmission of the TTI bundle and before the TTI where a feedback of the TTI bundle is expected, ignoring all the first feedback and the first uplink grant for retransmission;
   wherein at least one of a second feedback and a second uplink grant for retransmission is not ignored if at least one of the second feedback and the second uplink grant for retransmission is received during the TTI where the feedback of the TTI bundle is expected.

2. The method of claim 1, wherein the TTI where the feedback of the TTI bundle is expected is configured four TTIs later after the last TTI of the TTI bundle.

3. The method of claim 1, wherein the TTI where the feedback of the TTI bundle is expected is determined according to a TTI bundle size.

4. A communication device of a wireless communication system for appropriately handling a transmission time interval, hereinafter called TTI, bundling operation, the communication device comprising:
   a computer readable recording medium for storing program code corresponding to a process; and
   a processor coupled to the computer readable recording medium, for processing the program code to execute the process;
   wherein the process comprises:
      performing transmission of a TTI bundle; and
      when at least one of a first feedback and a first uplink grant for retransmission is received after the transmission of the TTI bundle and before the TTI where a feedback of the TTI bundle is expected, ignoring all first feedback and the first uplink grant for retransmission;
      wherein at least one of a second feedback and a second uplink grant for retransmission is not ignored if at least one of the second feedback and the second uplink grant for retransmission is received during the TTI where the feedback of the TTI bundle is expected.

5. The communication device of claim 4, wherein the TTI where the feedback of the TTI bundle is expected is configured four TTIs later after the last TTI of the TTI bundle.

6. The method of claim 4, wherein the TTI where the feedback of the TTI bundle is expected is determined according to a TTI bundle size.

* * * * *